(12) United States Patent
Meggiolan

(10) Patent No.: US 6,803,007 B2
(45) Date of Patent: Oct. 12, 2004

(54) METHOD FOR PRODUCING A CONNECTOR ELEMENT FOR CONNECTING FRAME PARTS AT A JOINT LOCATION IN A BICYCLE FRAMEWORK AND CONNECTOR ELEMENT OBTAINED THEREBY

(75) Inventor: Mario Meggiolan, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 88 days.

(21) Appl. No.: 10/073,407

(22) Filed: Feb. 13, 2002

(65) Prior Publication Data

US 2002/0110409 A1 Aug. 15, 2002

(30) Foreign Application Priority Data

Feb. 13, 2001 (IT) ..................................... TO2001A0120

(51) Int. Cl.⁷ .......................... B29C 70/44; B29C 70/46
(52) U.S. Cl. ........................ 264/257; 264/258; 264/313; 264/314; 249/180; 425/393; 425/403
(58) Field of Search ................................ 264/570, 571, 264/572, 257, 258, 313, 314; 249/180; 425/393, 403

(56) References Cited

U.S. PATENT DOCUMENTS

| | | | | |
|---|---|---|---|---|
| 4,038,490 A | * | 7/1977 | Miller et al. .................. | 174/88 |
| 4,361,533 A | | 11/1982 | Jenks et al. | |
| 4,683,099 A | * | 7/1987 | Buxton et al. ............... | 264/511 |
| 5,084,219 A | | 1/1992 | Sigur | |
| 5,266,137 A | * | 11/1993 | Hollingsworth .............. | 156/156 |
| 5,534,203 A | * | 7/1996 | Nelson et al. ............... | 264/101 |
| 6,290,889 B1 | * | 9/2001 | Castanie et al. ............. | 264/219 |
| 6,340,509 B1 | * | 1/2002 | Nelson et al. .............. | 428/34.7 |

FOREIGN PATENT DOCUMENTS

| | | | |
|---|---|---|---|
| EP | 0685386 | 6/1995 | |
| EP | 0829421 | 3/1998 | |
| ES | 2021998 | 11/1991 | |
| JP | 57-210820 | * 12/1982 | .................. 249/180 |
| WO | 9854046 | 3/1998 | |

* cited by examiner

Primary Examiner—Stefan Staicovici
(74) Attorney, Agent, or Firm—Volpe and Koenig, P.C.

(57) ABSTRACT

A connector element for connecting frame parts at a joint location in a bicycle frame is made of a single part of structural fiber based material, typically carbon fiber material, after reticulation in a mould exploiting the expansion of a core on which windings of fiber fabric material are provided, to obtain the application of a uniform radial pressure on the layers of fiber based material. In one embodiment, the connector element defines a bicycle bottom bracket and tubular extensions departing therefrom for connection to elements of the bicycle frame.

29 Claims, 4 Drawing Sheets

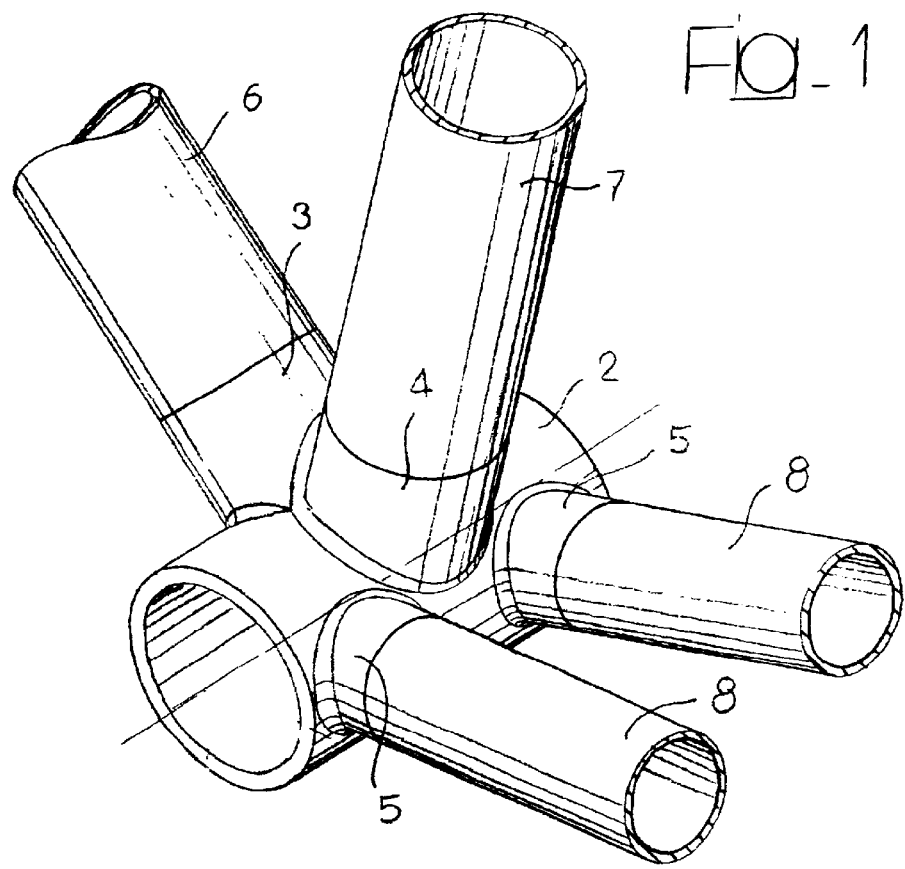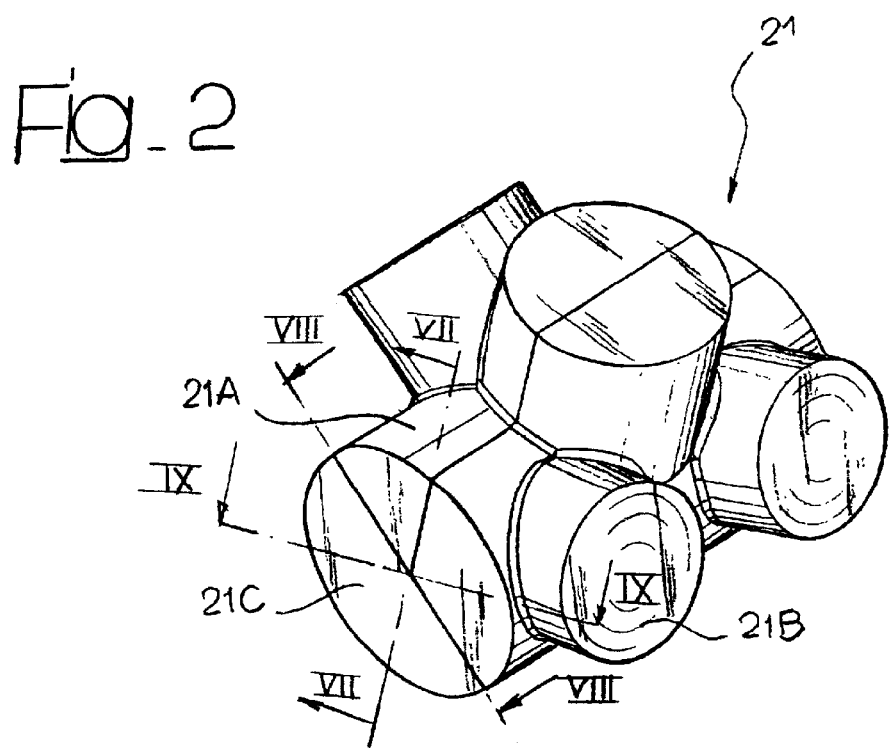

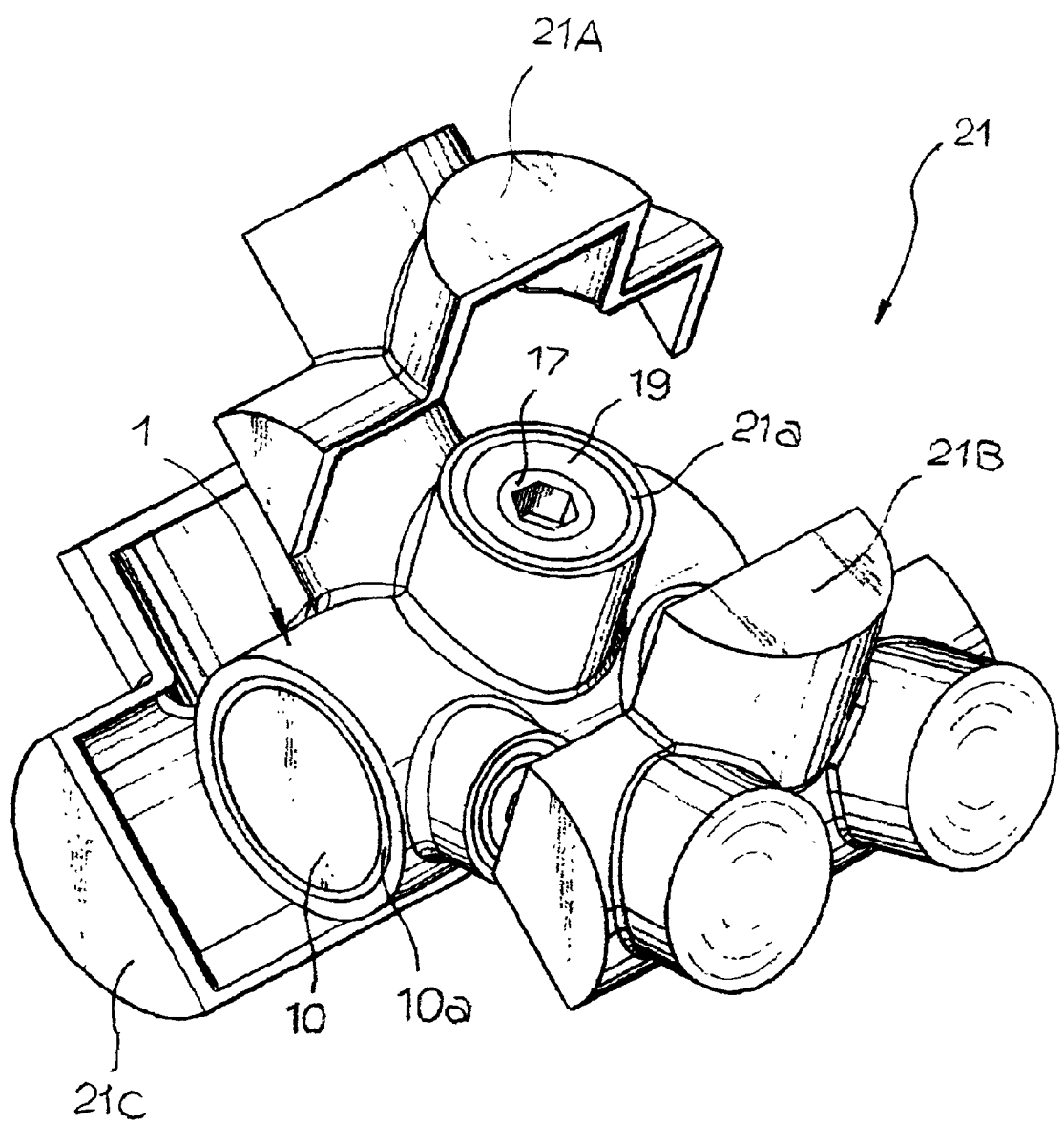

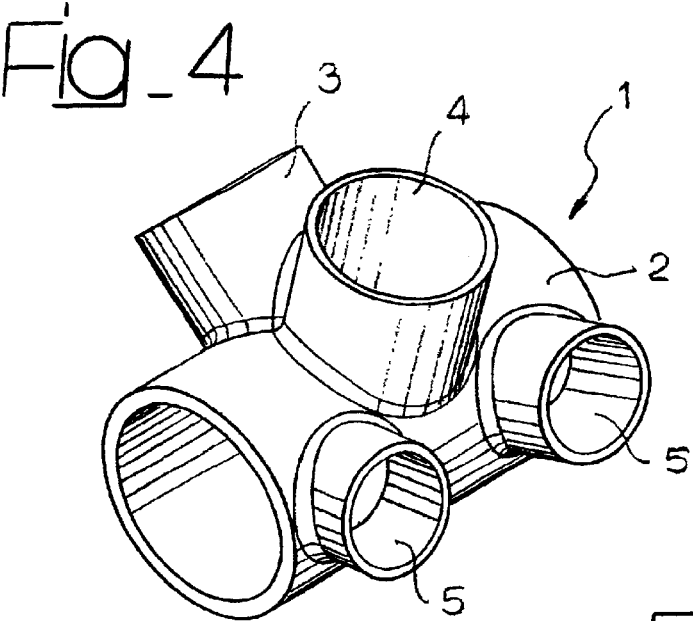
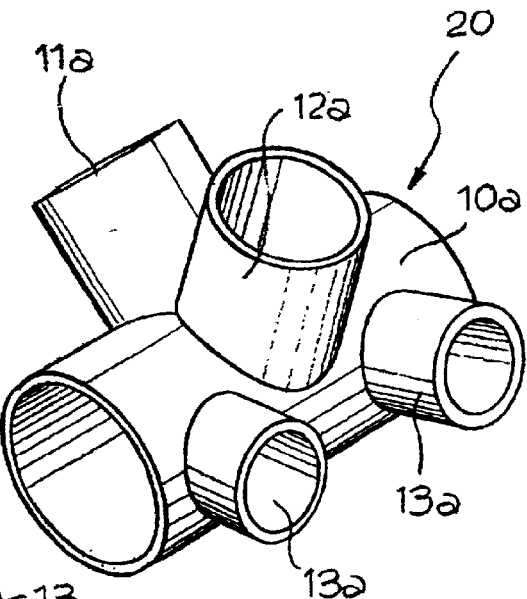
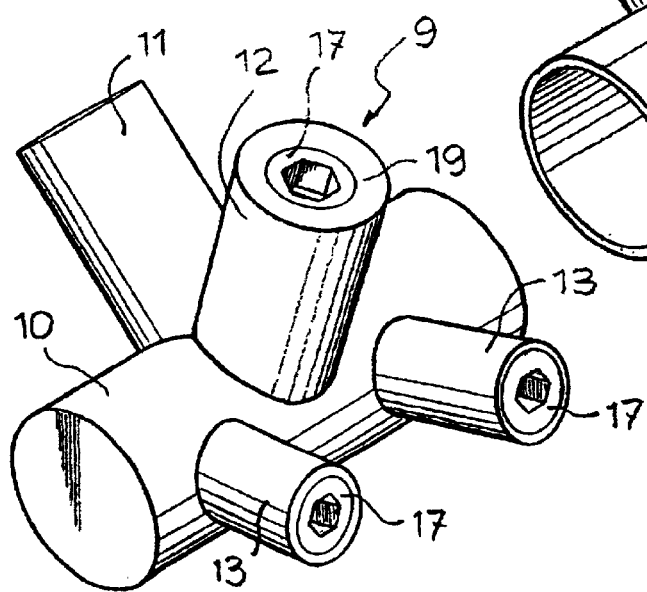

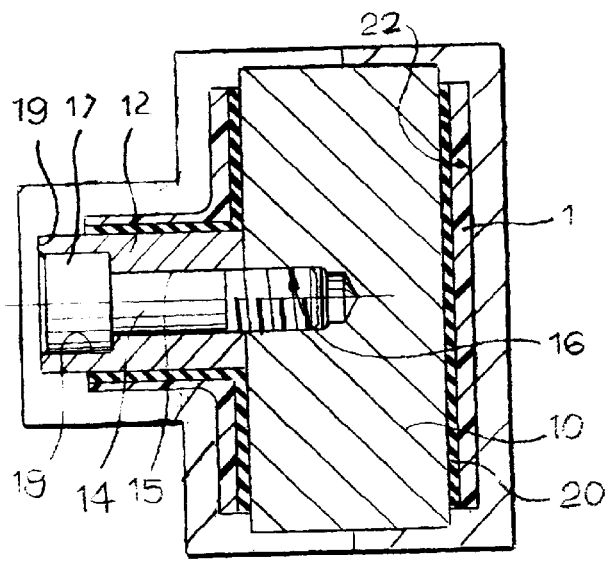
Fig_7
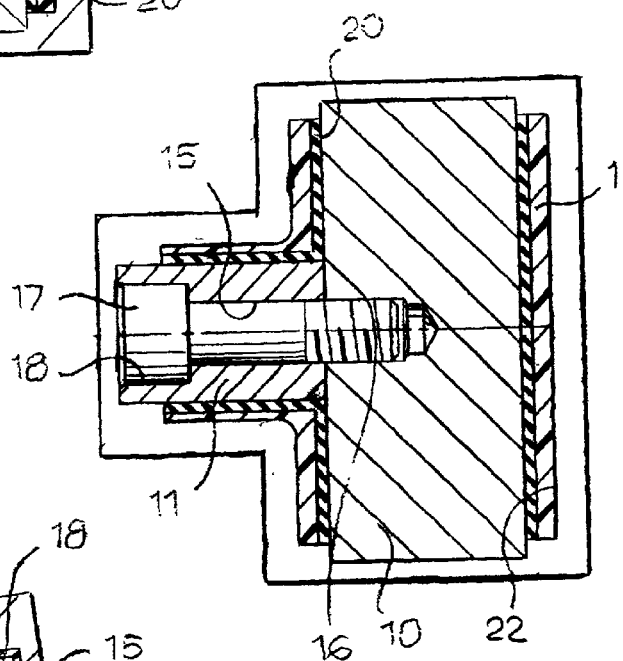
Fig_8
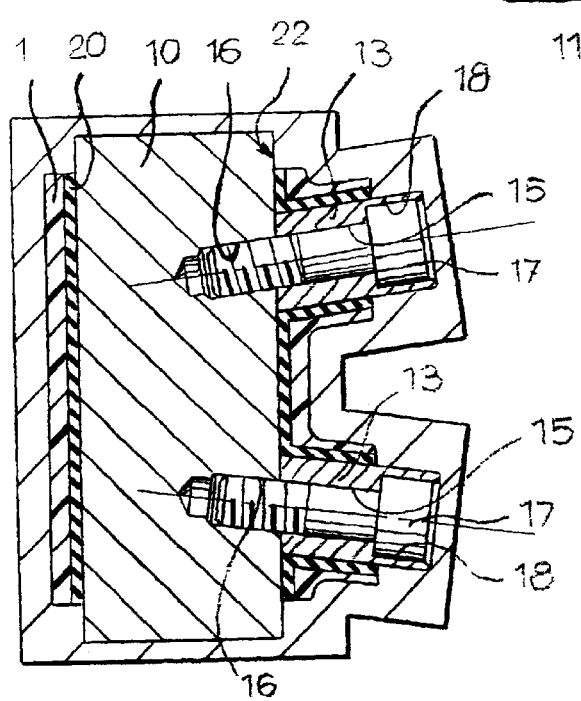
Fig_9

METHOD FOR PRODUCING A CONNECTOR ELEMENT FOR CONNECTING FRAME PARTS AT A JOINT LOCATION IN A BICYCLE FRAMEWORK AND CONNECTOR ELEMENT OBTAINED THEREBY

BACKGROUND OF THE INVENTION

The present invention relates to a method for producing a connector element for connecting frame parts at a joint location in a bicycle framework, and a connector element obtained thereby. The invention is further particularly related to a bicycle bottom bracket obtained by this method.

The Applicant has recently conducted various studies and tests to make bicycle components, such as wheel hubs or bottom brackets for housing the bicycle crank axle, using structural fibre based material, typically carbon fibre based material. The advantage offered by this type of material is that of being light in weight with respect to the metal materials used in the past, given equal structural characteristics. However, making a component of the above indicated type out of a single part of carbon fibre based material proved to be very difficult heretofore, due to the complex conformation of such components.

SUMMARY OF THE INVENTION

The object of this invention is to overcome this technical problem.

In order to attain this object, the present invention provides a method for producing a connector element for connecting frame parts at a joint location in a bicycle framework, characterized in that it comprises the following steps:

- arranging an expandable core,
- applying a number of layers of structural fibre fabric incorporated in a plastic material matrix around the core, to form a layered body, of predetermined shape and thickness,
- arranging the core with the layered body in the cavity of a mould,
- increasing the temperature of the mould (21) to a value sufficient to cause the reticulation of the plastic material matrix,
- expanding the core so as to apply a pressure on the body inside the mould,
- removing the body from the mould and removing the core from the body, so as to obtain a hollow body formed of a single piece of structural fibre based material.

Further features of the method of the invention are defined in the appended claims.

Structural fibre fabrics incorporated in a plastic material matrix are known and have been used for some time. They are made with yarn obtained from structural fibres, such as carbon fibres, for example. These fabrics are then subjected to a calendering process to associate them to a plastic material matrix, typically a thermosetting plastic material.

In the preferred embodiment of the method according to this invention which is defined in claims 9–19, a plurality of fabric layers of this type are wrapped around a core defined by a metal body with a sheath of expandable plastic material, the conformation of which correspond to that of the body to be obtained. In this way, when the mould is heated to reticulate the thermosetting matrix of the layered tubular body wrapped around the core, the material forming the sheath dilates whereby it applies a radial pressure on the walls of the hollow body, which is beneficial to obtain a product with the necessary structural characteristics. The fundamental advantage of the thermally dilating sheath is that of allowing the uniform application of such pressure, despite the possibly complex conformation of the preformed body.

In the preferred embodiment of this invention, said structural fibres are carbon fibres and the plastic material matrix is a thermosetting plastic material matrix. The temperature to which the mould must be taken in order to complete the process is preferably comprised in the range from 80° C. to 200° C. The mould is preferably maintained at a temperature in this range for a time comprised in the range from 10 minutes to three hours, preferably from 30 minutes to three hours from 30 minutes to three hours.

This invention also relates to a connector element for connecting frame parts at a joint location in a bicycle framework, which is obtained with the method of the invention. In the preferred embodiment, the method of the invention is used to obtain a bicycle bottom bracket, which is the part of the bicycle frame for housing the bicycle crank axle, with integrated tubular extensions for connecting the down tube and the seat tube of the bicycle frames which converge into the bottom bracket.

However, the invention may be also applied for obtaining a connector element to be used at any other different location of the bicycle frame where two or more frame parts converge into each other, such as at the intersections of the frame head tube with the top tube and the down tube or at the intersections of the seat tube with the top tube or the elements of the bicycle upper rear fork.

According to another aspect, the invention is also directed to a connector element for connecting frame parts at a joint location in a bicycle framework, characterized in that it consists of a single piece made of structural fibre based material, preferably carbon fibre material, incorporating a main tubular portion and one or more tubular branches departing from the main portion, which are to be connected to tubular elements of the bicycle frame.

As indicated above, the connector element of the invention is here shown in form of a bicycle bottom bracket, but can also be made in form of a connector element for any other joint location of the bicycle frame.

Naturally, once the method is completed, the body thus obtained can be subjected to additional machining, to make a finished product ready for use.

BRIEF DESCRIPTION OF THE DRAWINGS

This invention will be better explained by the following detailed descriptions with reference to the accompanying figures as non-limiting examples, whereas:

FIG. 1 is a perspective view of a bicycle bottom bracket, which can be made with the method according to this invention, shown in its mounted condition in a bicycle frame, FIG. 2 is a perspective view, in closed condition, of the mould used for obtaining the bottom bracket of FIG. 1, FIG. 3 is a perspective view of the mould in FIG. 2 in opened condition at the final stage of the method according to this invention, FIG. 4 is a perspective view of the bottom bracket per se, obtained at the end of the method according to this invention, FIG. 5 is a perspective view of the elastomeric material sheath used in the method according to this invention, FIG. 6 is a perspective view of the metal body used in the method according to this invention, and FIGS. 7, 8, 9 are cross-sectional views taken along lines VII—VII, VIII—VIII and IX—IX in FIG. 2.

DETAILED DESCRIPTION OF THE INVENTION

FIG. 4 in the accompanying drawings shows a perspective view of a bicycle bottom bracket according to this invention. In this figure, the bottom bracket is generically indicated with numeral 1. The bottom bracket, which can be obtained with the method according to this invention, consists of a single integral body made of structure fibre based material, typically carbon fibre material, but the structural fibres can be selected among carbon fibres, glass fibres, Kevlar fibres, or any combinations thereof. The bottom bracket 1 comprises a main cylindrical tubular portion 2, which is for receiving the crank axle of the bicycle, and four extensions, or tubular branches, 3, 4, 5, which depart from the main portion 2 along substantially radial directions. As shown in FIG. 1, which shows the component 1 assembled on the bicycle frame, the auxiliary branches 3, 4, 5 are to be connected (for example, glued) to other tubular elements of the bicycle frame converging towards the bottom bracket, specifically the down tube 6 of the frame, the seat tube 7 and the two branches 8 of the rear fork of a bicycle.

In the preferred embodiment, in order to obtain the body 1 with the method according to this invention, a metal body of corresponding shape is arranged as shown in the perspective view in FIG. 6. The metal body, generally indicated with numeral 9, comprises a main cylindrical portion 10, which is to form the main portion 2 of the bottom bracket 1, as well as a plurality of auxiliary branches 11, 12, 13 each being cylindrical in shape, which extend from the main portion 10 in directions which are substantially radial. The main portion 2 and/or one or more of the plurality of auxiliary branches 11, 12, 13 can also have an elliptical or other shapes. Further, the auxiliary branches 11, 12, 13 can be connected to the main portion 2 also at non radial directions. The various elements forming the metal body 9 are connected together by means of screws 14 (see FIGS. 7–9) and can be separated. Each screw 14 crosses an axial through hole of a respective auxiliary branch 11, 12 or 13 of the metal body 9 and is engaged in a closed-back threaded hole 16 in the main portion 10 of the metal body. The head 17 of each fastening screw 14 is received in a cavity 18 made in the end surface 19 of the respective branch 11, 12, or 13 of the metal body. In this way, the upper surface of the head 17 of each screw is on the same level as the external surface 19 of the respective core branch. Each head 17 presents a hexagonal recess for engaging a tool. Thanks to the arrangement described above, the metal body 9 can be easily assembled and disassembled, as additionally described below.

For the purpose of making the body 1, the metal body 9 is covered with an elastomeric material sheath 20 (see FIG. 5), the shape of which essentially corresponds to that of the inner surface of the product to be obtained so to be fitted upon the various elements of the metal body with a slight interference, for which the elastic return of the material forming the sheath ensures the connection of the sheath with the metal body 9. Naturally, the fact that the metal body 9 can be disassembled also facilitates covering the metal body with the sheath, since each of the elements forming the metal body 9 can be introduced separately in the respective cavity in the sheath and can then be joined with the other components of the metal body. With reference to FIG. 5, the sheath 20 presents a main tubular portion 10a destined to cover the main portion 10 of the metal body and auxiliary tubular branches 11a, 12a, 13a destined to cover the branches 11, 12, 13 of the metal body.

A layer of structural fibre base fabric (typically carbon fibre fabric) incorporated in a thermosetting plastic material matrix is arranged on the core formed by the metal body 9 and the sheath applied on it. In practice, the layers are made by continuously wrapping a strip of fabric around the main portion of the sheath and around the various auxiliary branches, similarly to an orthopaedic bandaging on a human limb. Preferably, the layers are completed with a number of plies each presenting a central opening, which are applied around the various auxiliary branches of the core coated with the sheath, in the area in which the branches depart from the main portion of the core each passing through the hole of the respective ply. Said layers are applied to obtain a layered hollow body of the required dimensions and proportions. This body is generally indicated with numeral 1 in FIGS. 7–9.

The assembly formed by the core 9,20 and the layered hollow body 1 formed over the core is arranged in the cylindrical cavity 21 of a mould formed by three casings 21a, 21b, 21c which are clearly visible in FIGS. 2, 3. The shape of the mould corresponds to that of the product to be obtained and, consequently, defines a main cylindrical portion from which four radially directed auxiliary branches depart. For the sake of simplicity, the drawings do not show the connection means between the three casings of the mould 21. Evidently, these means can be made in any known way.

After positioning the assembly formed by the core 9,20 and the layered body 1 formed on the core in the mould, the mould is taken to a temperature sufficient to cause the reticulation of the thermosetting plastic material matrix belonging to the body 1, for example to a temperature comprised between 80° C. and 200° C. This temperature increase is maintained for a time comprised in the range from 10 minutes to 3 hours, preferably from 30 minutes to three hours. In this way, the material forming the sheath 20 dilates. This dilation is mainly impressed radially outwards, by which a radial pressure is exerted outwards against the walls of all the tubular parts of the body 1, which is thus pushed against the wall of the cylindrical cavity 21. In this way, a uniform pressure is applied on all the parts of the hollow body 1, despite the complex conformation of the body illustrated herein. In the meantime, the plastic material matrix is subjected to reticulation.

After a cooling stage, the mould is opened and the assembly comprising the core 9, 20 and the moulded body 1 is extracted at the end of the reticulation phase. At this point, the elements 11, 12, 13 and 10 forming the metal body 9 are extracted from the assembly after removing the connecting screws by engaging a tool in the recesses of the heads 17 of the screws. When the metal body is removed, the elastomeric sheath 20 remains inside the carbon fibre hollow body. At this point, the sheath can be easily removed from inside the hollow body, thanks to its elasticity. The body 1 thus obtained presents the shape shown in FIG. 4. As shown, it can naturally be subjected to additional machining, in order to obtain the finished product ready for use, which is connected to the tubular elements of the bicycle frame in the way shown in FIG. 1.

As mentioned above, the elastomeric material forming the sheath 20 is preferably a material with a thermal dilation coefficient exceeding $15 \times 10^{-5}$ mm/° C. and a maximum continuous heat resistance temperature exceeding 100° C. For example, said material forming the sheath 20 can be a synthetic rubber of the type marketed under the trademark AIRCAST 3700 by Airtech International Inc., Huntington Beach, Calif., USA. This material is preferred for its relatively high thermal dilation coefficient, as well as its high continuous heat resistance, for its good thermal conductivity and for its good ultimate tensile stress, as described above in detail.

Naturally, while the principle of the invention remains the same, the embodiments and the details of construction may widely vary without departing from the scope of the invention.

For example, the winding stage of fibre fabric may be completed with one or more additional strips wound around the ends of one or more portions of the expandable core in order to provide enlarged diameter and increased thickness at selected locations.

In a different embodiment, the expandable core may be provided in the form defined in claims 24–28. Thus, in place of the metal body 9 with the associated sheath 20, a body of expandable material, typically PTFE, can be used. This body may be made of separate pieces removably connected to each other to render extraction thereof from the finished product possible.

In another different embodiment, the expandable core includes a body of metal material including a number of separate sectors, the expansion of the core being obtained through a radially outward movement of these sectors.

As also indicated in the initial portion of this description, the connector element of the invention is here shown in form of a bicycle bottom bracket, but can also be made in form of a connector element for any other joint location of the bicycle frame, such as at the intersections of the frame head tube with the top tube and the down tube or at the intersections of the seat tube with the top tube or with the elements of the bicycle upper rear fork.

Again, any variations in the details of construction or the embodiments which do not depart from the principles outlined above are comprised within the scope of the present invention.

What is claimed is:

1. Method for producing a connector element for connecting frame parts at a joint location in a bicycle framework, wherein the method comprises the following steps:
   arranging an expandable core having a reusable inner body, made from a metal material with a main cylindrical portion and one or more auxiliary cylindrical branches extending from the main portion and removably connected thereto by means of screws, covered with a deformable sheath made of an elastomeric material, the expansion of the core being obtained through the dilation of the material forming the sheath in response to an increased temperature,
   applying a number of layers of structural fibre fabric incorporated in a plastic material matrix around the core, to form a layered outer body, of predetermined shape and thickness,
   arranging the core with the layered outer body in the cavity of a mould,
   increasing the temperature of the mould to a value sufficient to cause the reticulation of the plastic material matrix,
   expanding the core, so as to apply a pressure on the outer body inside the mould,
   removing the outer body from the mould and removing the reusable body from the outer body, so as to obtain a hollow molded body formed of a single piece of structural fibre based material.

2. Method according to claim 1, wherein the increase of temperature of the mould and the expansion of the core occur substantially simultaneously.

3. Method according to claim 1, wherein a cooling phase is provided before removal of the outer body from the mould.

4. Method according to claim 1, wherein said structural fibres are selected from the group consisting of: carbon fibres, glass fibres, Kevlar fibres, or any combinations thereof.

5. Method according to claim 1, wherein said plastic material matrix is a thermosetting plastic material matrix.

6. Method according to claim 1, wherein said temperature is comprised in the range from 80° C. to 200° C.

7. Method according to claim 6, wherein said temperature is maintained for a time comprised in the range ten minutes to three hours.

8. Method according to claim 7, wherein said temperature is maintained for a time comprised in the range from thirty minutes to three hours.

9. Method according to claim 1, wherein the elastomeric material forming the aforesaid sheath has a thermal dilation coefficient exceeding $15 \times 10^{-5}$ mm/° C. and a maximum continuous heat resistance temperature exceeding 100° C.

10. Method according to claim 1, wherein the elastomeric material forming the sheath is a synthetic rubber.

11. Method according to claim 1, wherein each auxiliary branch of the reusable body is fastened to the main portion of the core by means of a screw along the axis of the auxiliary branch through a hole of said branch engaging a threaded hole in the main portion.

12. Method according to claim 11, wherein the head of each fastening screw is received in a cavity made in the end surface of the respective branch of the reusable body, so that said head does not project from said end surface.

13. Method according to claim 12, wherein the head of each screw presents a hexagonal recess for engagement of a tool.

14. Method according to claim 1, wherein said sheath presents a hollow shape corresponding to that of the reusable body.

15. Method according to claim 14, wherein the sheath is applied on the core by slightly stretching it so that the sheath adheres to the core by effect of its elasticity.

16. Method according to claim 14, wherein after removal of the outer body from the mould, the reusable body is separated from the outer body, leaving the sheath inside the outer body, whereupon the sheath is removed from inside the outer body.

17. Method according to claim 1, wherein the layers of fabric on the expandable core are defined by one or more windings of at least one strip of fabric around the core.

18. Method according to claim 1, wherein the layers of fabric are defined by at least one strip wound continuously around the core so as to cover completely the main portion and the branches of the core.

19. Method according to claim 18, wherein the layers of fabric further comprise one or more additional plies, each presenting a hole, which are applied in the area of the main portion of the core from which an auxiliary branch departs, said branch passing through the hole of the respective ply.

20. Method according to claim 18, wherein the layers of fabric further comprise one or more additional stripe wound around the ends of one or more portions of the expandable core in order to provide enlarged diameter and increased thickness at selected locations.

21. Method according to claim 1, wherein said core consists of a number of separate elements, in order to allow for the separation of the core from the hollow body after extraction from the mould.

22. Method according to claim 1, wherein the expandable core includes a number of separate sectors, the expansion of the core being obtained through a radially outward movement of said sectors.

23. Method according to claim 1 wherein said mould and said core are shaped and arranged in order to produce a connector element defining a bicycle bottom bracket with associated tubular extensions for connection to bicycle frame tubes converging towards the bottom bracket.

24. Method according to claim 22, wherein mould and said core are shaped and arranged in order to produce a connector element for connection of bicycle frame tubes at any of the joint locations of a bicycle frame where the frame tubes converge towards each other.

25. Method according to claim 1, wherein the pressure on the outer body caused by said expanding step is substantially radial.

26. A method for producing a connector element for connecting frame parts at a joint location in a bicycle framework, wherein the method comprises the following steps:

arranging an expandable core;

applying a number of layers of structural fibre fabric incorporated in a plastic material matrix around the core, to form a layered outer body, of predetermined shape and thickness;

arranging the core with the layered outer body in the cavity of a mould;

increasing the temperature of the mould to a value sufficient to cause the reticulation of the plastic material matrix;

expanding the core, so as to apply a pressure on the outer body inside the mould;

removing the body from the mould and removing the core from the outer body, so as to obtain a hollow body formed of a single piece of structural fibre based material;

wherein the expandable core includes a body of metal material having a main portion and auxiliary branches extending from the main portion covered with a deformable sheath made of an elastomeric material, the expansion of the core being obtained through the dilation of the material forming the sheath when the temperature of the mould is increased;

wherein the branches are removably connected to the main portion of the metal body by means of screws.

27. The method according to claim 26, wherein each auxiliary branch of the metal body is fastened to the main portion of the core by means of a screw along the axis of the auxiliary branch through a hole of said branch engaging a threaded hole in the main portion.

28. The method according to claim 27, wherein the head of each fastening screw is received in a cavity made in the end surface of the respective branch of the metal body, so that said head does not project from said end surface.

29. The method according to claim 28, wherein the head of each screw presents a hexagonal recess for engagement of a tool.

* * * * *

UNITED STATES PATENT AND TRADEMARK OFFICE
CERTIFICATE OF CORRECTION

PATENT NO. : 6,803,007 B2
DATED : October 12, 2004
INVENTOR(S) : Mario Meggiolan It is certified that error appears in the above-identified patent and that said Letters Patent is hereby corrected as shown below:

Column 2,
Line 15, after the first instance of the word "hours", delete "from 30 minutes to three hours --.

Column 6,
Line 24, after the word "exceeding", delete "$15 \times 10^{-5}$ $mm/°C$." and insert therefor -- $15 \times 10^{-5}$ $mm/°C$ --.
Line 64, after the word "additional", delete "stripe" and insert therefor -- strips --.

Signed and Sealed this

Fifth Day of April, 2005

JON W. DUDAS
*Director of the United States Patent and Trademark Office*